(12) United States Patent
Ling (10) Patent No.: US 10,598,781 B2
(45) Date of Patent: Mar. 24, 2020

(54) COOPERATIVE AND CROWD-SOURCED MULTIFUNCTIONAL AUTOMOTIVE RADAR

(71) Applicant: Maxlinear, Inc., Carlsbad, CA (US)

(72) Inventor: Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 634 days.

(21) Appl. No.: 15/167,539

(22) Filed: May 27, 2016

(65) Prior Publication Data

US 2016/0349365 A1  Dec. 1, 2016

Related U.S. Application Data

(60) Provisional application No. 62/167,950, filed on May 29, 2015.

(51) Int. Cl.
*G01S 13/93* (2006.01)
*G01S 7/28* (2006.01)
(Continued)

(52) U.S. Cl.
CPC ............ *G01S 13/931* (2013.01); *G01S 7/006* (2013.01); *G01S 7/2813* (2013.01); *G01S 13/42* (2013.01);
(Continued)

(58) Field of Classification Search
CPC ........ G01S 13/931; G01S 13/42; G01S 13/86; G01S 13/87; G01S 13/89; G01S 13/0209; G01S 13/106; G01S 13/284; G01S 13/325; G01S 13/342; G01S 13/346; G01S 13/347; G01S 13/60; G01S 13/874; G01S 2013/9342; G01S 2013/9346; G01S 2013/935; G01S 2013/936; G01S 2013/9353; G01S 2013/9357; G01S 2013/9375; G01S 2013/9378; G01S 2013/9382; G01S 2013/9385; G01S 2013/9389; G01S 2013/9392; G01S 7/006; G01S 7/2813; G01S 7/4004
See application file for complete search history.

(56) References Cited

U.S. PATENT DOCUMENTS

4,110,754 A * 8/1978 Endo ..................... G01S 13/931
342/147
4,833,469 A * 5/1989 David ................... G01S 13/931
180/169
(Continued)

*Primary Examiner* — Bernarr E Gregory
(74) *Attorney, Agent, or Firm* — Maschoff Brennan; Jason W. Croft (57) ABSTRACT

A system comprises a multifunction radar receiver that in turn comprises processing circuitry and front-end circuitry. The front-end circuitry is operable to receive a millimeter wave burst via a plurality of antennas to generate a plurality received signals. The processing circuitry is operable to receive a first scene representation that is an aggregate of scene representations generated by one or more other radar receivers. The processing circuitry is operable to process the received signals to generate a second scene representation. The processing circuitry is operable to compare the first scene representation and the second scene representation and generate a difference scene based on the comparison. The processing circuitry is operable to generate a control signal based on the difference scene.

20 Claims, 9 Drawing Sheets

(51) Int. Cl.
*G01S 13/89* (2006.01)
*G01S 13/87* (2006.01)
*G01S 13/86* (2006.01)
*G01S 13/42* (2006.01)
*G01S 7/00* (2006.01)
*G01S 7/40* (2006.01)
*G01S 13/28* (2006.01)
*G01S 13/32* (2006.01)
*G01S 13/34* (2006.01)
*G01S 13/60* (2006.01)
*G01S 13/10* (2006.01)
*G01S 13/931* (2020.01)
*G01S 13/00* (2006.01)
*G01S 13/02* (2006.01)

(52) U.S. Cl.
CPC .............. *G01S 13/86* (2013.01); *G01S 13/87* (2013.01); *G01S 13/89* (2013.01); *G01S 7/4004* (2013.01); *G01S 13/0209* (2013.01); *G01S 13/106* (2013.01); *G01S 13/284* (2013.01); *G01S 13/325* (2013.01); *G01S 13/342* (2013.01); *G01S 13/346* (2013.01); *G01S 13/347* (2013.01); *G01S 13/60* (2013.01); *G01S 13/874* (2013.01); *G01S 2013/935* (2013.01); *G01S 2013/936* (2013.01); *G01S 2013/9342* (2013.01); *G01S 2013/9346* (2013.01); *G01S 2013/9353* (2013.01); *G01S 2013/9357* (2013.01); *G01S 2013/9375* (2013.01); *G01S 2013/9378* (2013.01); *G01S 2013/9382* (2013.01); *G01S 2013/9385* (2013.01); *G01S 2013/9389* (2013.01); *G01S 2013/9392* (2013.01)

(56) References Cited

U.S. PATENT DOCUMENTS

| | | | |
|---|---|---|---|
| 2012/0123667 A1* | 5/2012 | Gueziec | G08G 1/0112 701/119 |
| 2013/0082870 A1* | 4/2013 | Chambers | G01S 13/90 342/25 A |
| 2013/0113647 A1* | 5/2013 | Sentelle | G01S 13/32 342/22 |
| 2014/0321693 A1* | 10/2014 | Bon | G01S 13/89 382/100 |
| 2015/0061926 A1* | 3/2015 | Ranney | G01S 13/9029 342/25 B |
| 2015/0168546 A1* | 6/2015 | Nakagawa | G01S 7/282 342/21 |
| 2015/0204971 A1* | 7/2015 | Yoshimura | G01S 13/345 342/70 |
| 2016/0146931 A1* | 5/2016 | Rao | H01Q 1/3233 342/59 |
| 2016/0223643 A1* | 8/2016 | Li | G01S 7/023 |

* cited by examiner

COOPERATIVE AND CROWD-SOURCED MULTIFUNCTIONAL AUTOMOTIVE RADAR

PRIORITY CLAIM

This application claims priority to the following application(s), each of which is hereby incorporated herein by reference:
U.S. provisional patent application 62/167,950 titled "Cooperative and Crowd-Sourced Multifunctional Automotive Radar" filed on May 29, 2015.

INCORPORATION BY REFERENCE

The entirety of each of the following applications is hereby incorporated herein by reference:
U.S. provisional patent application 62/155,728 titled "Multistatic Radar via an Array of Multifunctional Automotive Transceivers" filed on May 1, 2015;
U.S. patent application Ser. No. 15/142,926 titled "Multistatic Radar via an Array of Multifunctional Automotive Transceivers" filed on Apr. 29, 2016;
U.S. provisional patent application 62/160,015 titled "Calibration of a Multifunctional Automotive Radar System" filed on May 12, 2015;
U.S. patent application Ser. No. 15/150,831 titled "Calibration of a Multifunctional Automotive Radar System" filed May 10, 2016;
U.S. provisional patent application 62/154,840 titled "Multifunctional Automotive Radar" filed on Apr. 30, 2015;
U.S. patent application Ser. No. 15/142,935 titled "Multifunctional Automotive Radar" filed on Apr. 29, 2016;
U.S. provisional patent application 62/162,206 titled "Dynamic OFDM Symbol Shaping for Radar Applications" filed on May 15, 2015;
U.S. patent application Ser. No. 15/150,821 titled "Dynamic OFDM Symbol Shaping for Radar Applications" filed on May 10, 2016;
U.S. provisional patent application 62/160,316 titled "Scalable Architecture for an Automotive Radar System" filed on May 12, 2015; and
U.S. patent application Ser. No. 15/150,669 titled "Scalable Architecture for an Automotive Radar System" filed on May 10, 2016.

BACKGROUND

Limitations and disadvantages of conventional automotive radar systems and methods will become apparent to one of skill in the art, through comparison of such approaches with some aspects of the present method and system set forth in the remainder of this disclosure with reference to the drawings.

BRIEF SUMMARY

Methods and systems are provided for cooperative and crowd-sourced multifunctional automotive radar, substantially as illustrated by and/or described in connection with at least one of the figures, as set forth more completely in the claims.

DETAILED DESCRIPTION

Figure 1:
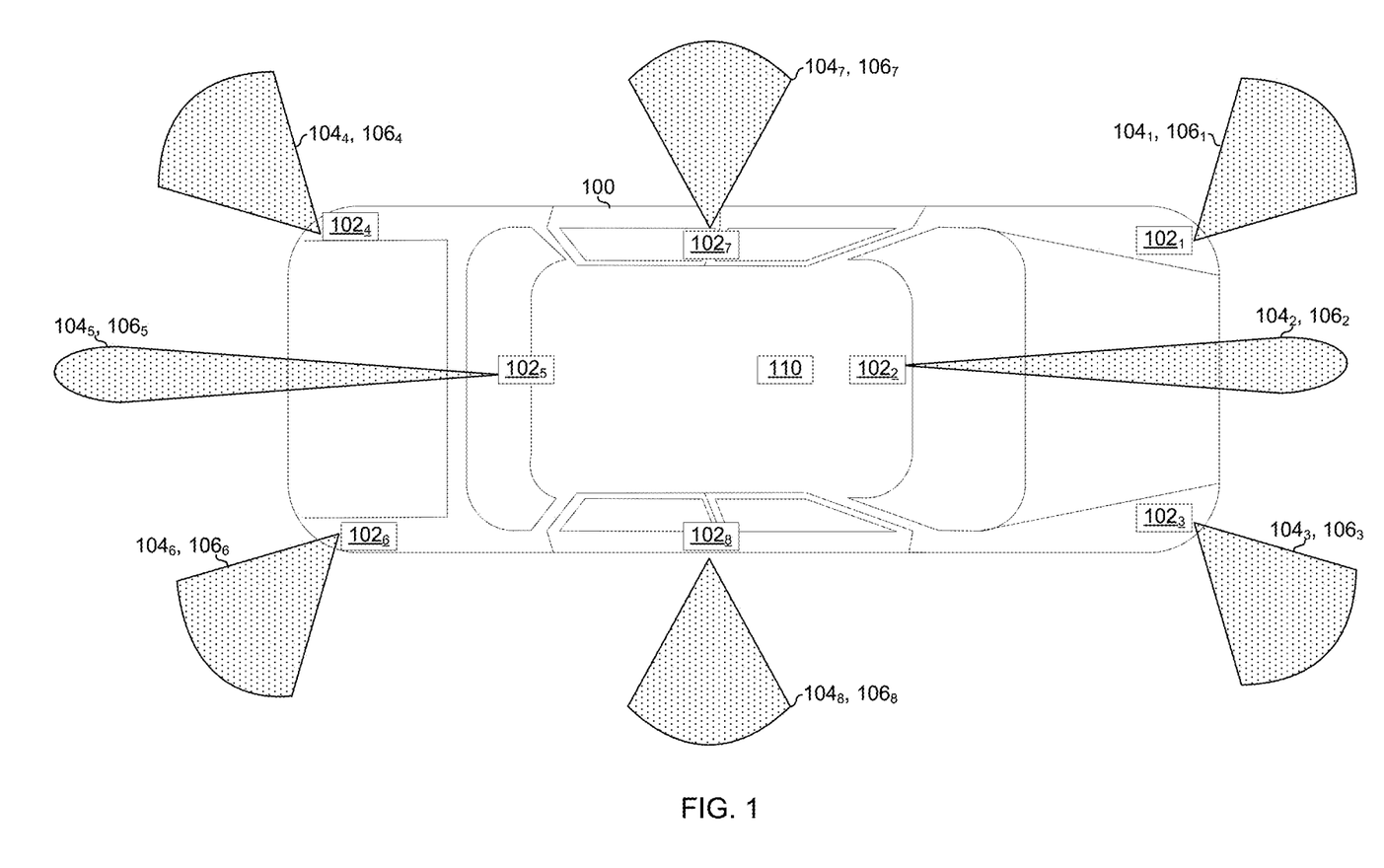
FIG. 1 shows an automobile comprising a plurality of multifunctional radar transceivers.

FIG. 1 shows an automobile comprising a plurality of multifunctional radar transceivers 102 (labeled with subscripts '1' through '8') of an automobile 100. Although the example automobile 100 comprises eight transceivers 102 for illustration, any number may be present. Each multifunctional radar transceiver 102 has a corresponding receive antenna pattern 104 and transmit antenna pattern 106 (for clarity of illustration, the transmit and receive patterns are shown as the same, but they need not be). As discussed in further detail in the remainder of this disclosure, the multifunctional radar transceivers 102 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 100 (the "scene").

The positioning function comprises use of the same millimeter wave signals used for the radar function to improve upon coarse position determined through other mechanisms such as GPS.

The communication function comprises communicating data among the multifunction radar transceivers 102 using of the same millimeter wave signals as are used for the radar function. Such data may include, for example, pixel or voxel data (and time and position metadata) generated using the radar and positioning functions.

Through a combination of the radar function, the positioning function, and the communication function, the multifunctional radar transceivers $102_1$-$102_8$ are operable to generate a scene representation (e.g., 2D pixel grid or 3D voxel grid) where the absolute time of capture of the scene representation and the absolute position of the pixels (2D) or voxels (3D) in the scene representation are known.

The circuitry 110 represents other circuitry of the automobile 100 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 110 may be communicatively coupled to the transceivers 102 via a CANbus, for example. The circuitry 110 may be operable to process data from the transceivers and take action (e.g., trigger driver alerts, transmit messages via one or more of its transceivers, trigger braking or other safety systems, etc.) in response to such data. The circuitry 110 may also generate data which it may pass to the transceiver(s) 102 for communication to a remote transceiver 102 (e.g., that is mounted to another automobile and/or to infrastructure such the road, sign post, stop-light, etc.) In an example implementation, the circuitry 110 may comprise a cell phone that connects to an electronics system of the automobile 100 via USB, Bluetooth, Wi-Fi, or any other suitable interface and then the electronics system 110 of the automobile 100 leverages the cellular transceiver of the circuitry 110 for connecting to a cellular network.

Figure 2A:
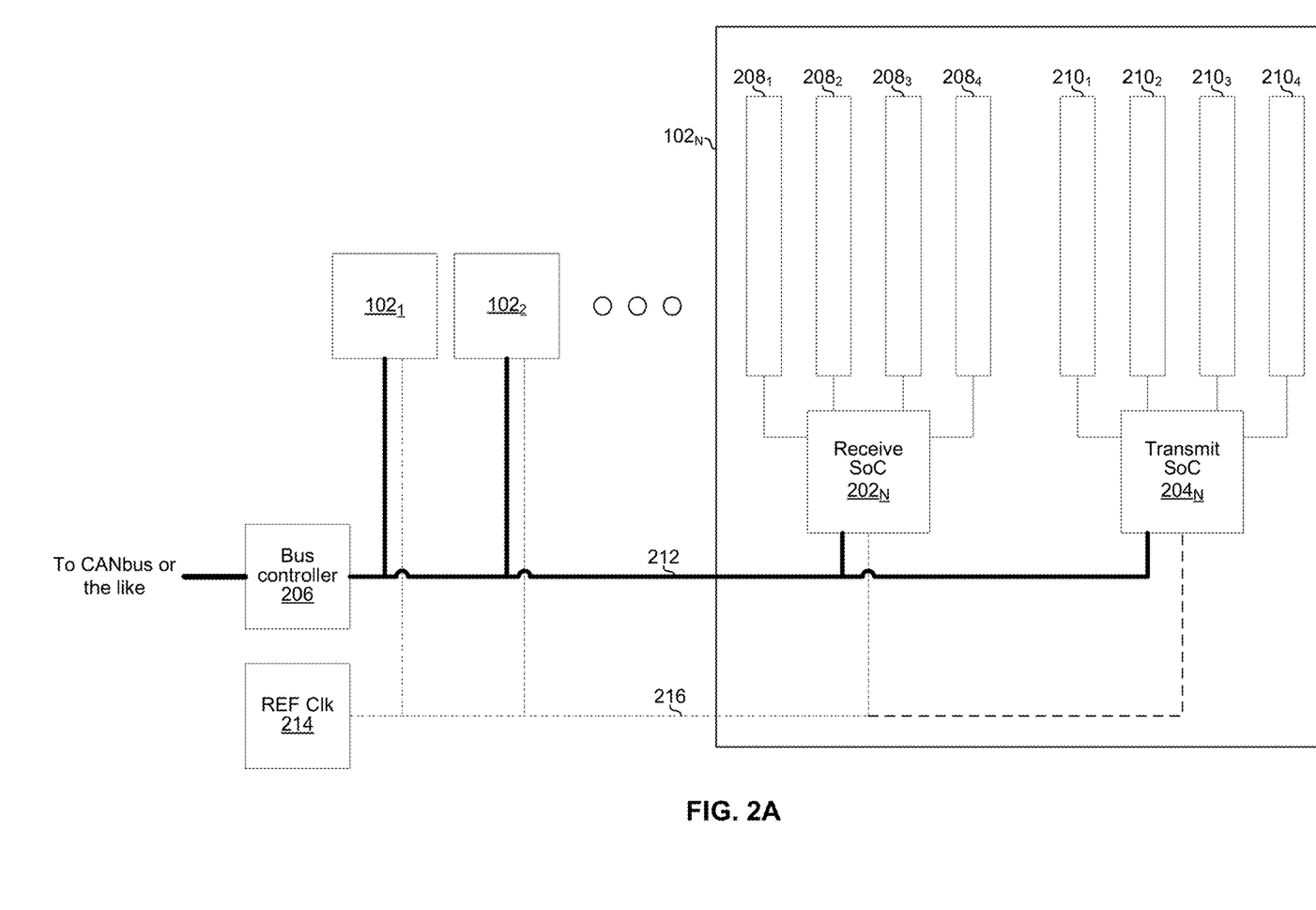
FIG. 2A shows an example architecture of a multifunctional radar system of an automobile.

FIG. 2A shows an example architecture of a multifunctional radar system of an automobile. The example multifunctional radar system 200 comprises N multifunction radar transceivers 102, a bus controller 206, a reference clock generator 214, data bus 212, and clock distribution bus 216. For clarity of illustration, example implementation details are shown for only the $N^{th}$ transceiver ($102_N$), but the other transceivers $102_1$-$102_{N-1}$ may be the same. Each multifunctional radar transceiver $102_n$ (the subscript 'n' used here to generically represent each of the transceivers $102_1$-$102_N$ individually) comprises a receive SoC $202_n$, a transmit SoC $204_n$, a plurality of receive antenna elements 208 (labeled with subscripts 1 through 4, where four was chosen arbitrarily for illustration but any number greater than one may be used), and a plurality of transmit antenna elements 210 (labeled with subscripts 1 through 4, where four was chosen arbitrarily for illustration but any number greater than one may be used, and the number of transmit antenna elements need not match the number of receive antenna elements). In an example implementation, each of the multifunctional radar transceivers 102 comprises one or more CMOS dies on a printed circuit board. In an example implementation, each of the receive SoCs $202_N$, the transmit SoC $204_N$, the bus controller 206, and the reference clock generator 214 is a separately packaged CMOS integrated circuit.

Each of the receive antenna elements $208_1$-$208_4$ comprises, for example, a copper microstrip patch antenna on a printed circuit board (e.g., FR4, Duroid, or the like). Although four elements 208 are shown for illustration, any number may be used.

Each receive SoC $202_n$ is operable to receive millimeter wave signals (e.g., in the 76 to 81 GHz band) via the antenna elements $208_1$-$208_4$. The receive SoC $202_n$ is operable to process received millimeter wave signals for supporting the radar, positioning, and communication functions. The receive SoC $202_n$ is also operable to communicate over data bus 212 and to synchronize its timing to a signal output by reference clock 214 onto clock distribution bus 216. Additional details of an example receive SoC $202_n$ are described below with reference to FIG. 2B.

Each of the transmit antenna elements 210 comprises, for example, a copper microstrip patch antenna on a printed circuit board (e.g., FR4, Duroid, or the like). Although four elements 210 are shown for illustration, any number may be used.

The transmit SoC $204_n$ is operable to transmit millimeter wave signals (e.g., in the 76 to 81 GHz band) via the antenna elements $210_1$-$210_4$. The transmit SoC $204_n$ is operable to generate the signals in such a manner as to support the radar, positioning, and communication functions. The transmit SoC $204_n$ is also operable to communicate over data bus 212 and to synchronize its timing to a signal output by reference clock 214 onto clock distribution bus 216. Additional details of an example transmit SoC $204_n$ are described below with reference to FIG. 2C.

The bus controller 206 is operable to relay data between the data bus 212 interconnecting the multifunction radar transceivers $102_1$-$102_N$ and a data bus of the automobile 100 (e.g., a CAN bus). The bus 212 may, for example, be a high speed serial bus and the bus controller 206, receive SoC $202_n$, and transmit SoC $204_n$ may each be operable to perform serialization and deserialization for communicating over the bus 212.

The reference clock generator 212 comprises a crystal oscillator, phase locked loop, and/or other circuitry for generating a signal to act as a phase reference for receive SoC $202_n$ and transmit SoC $204_n$. In an example implementation, the frequency of the reference signal may be relatively low compared to the millimeter wave frequencies (e.g., on the order of tens or hundreds of MHz), which may greatly relax the routing requirements for the bus 216 as compared to trying to distribute a reference signal in the 77 to 81 GHz range. In another example implementation, the frequency of the reference signal may be the same as the millimeter wave carrier frequency (e.g., it the range 77 to 81 GHz).

Figure 2B:
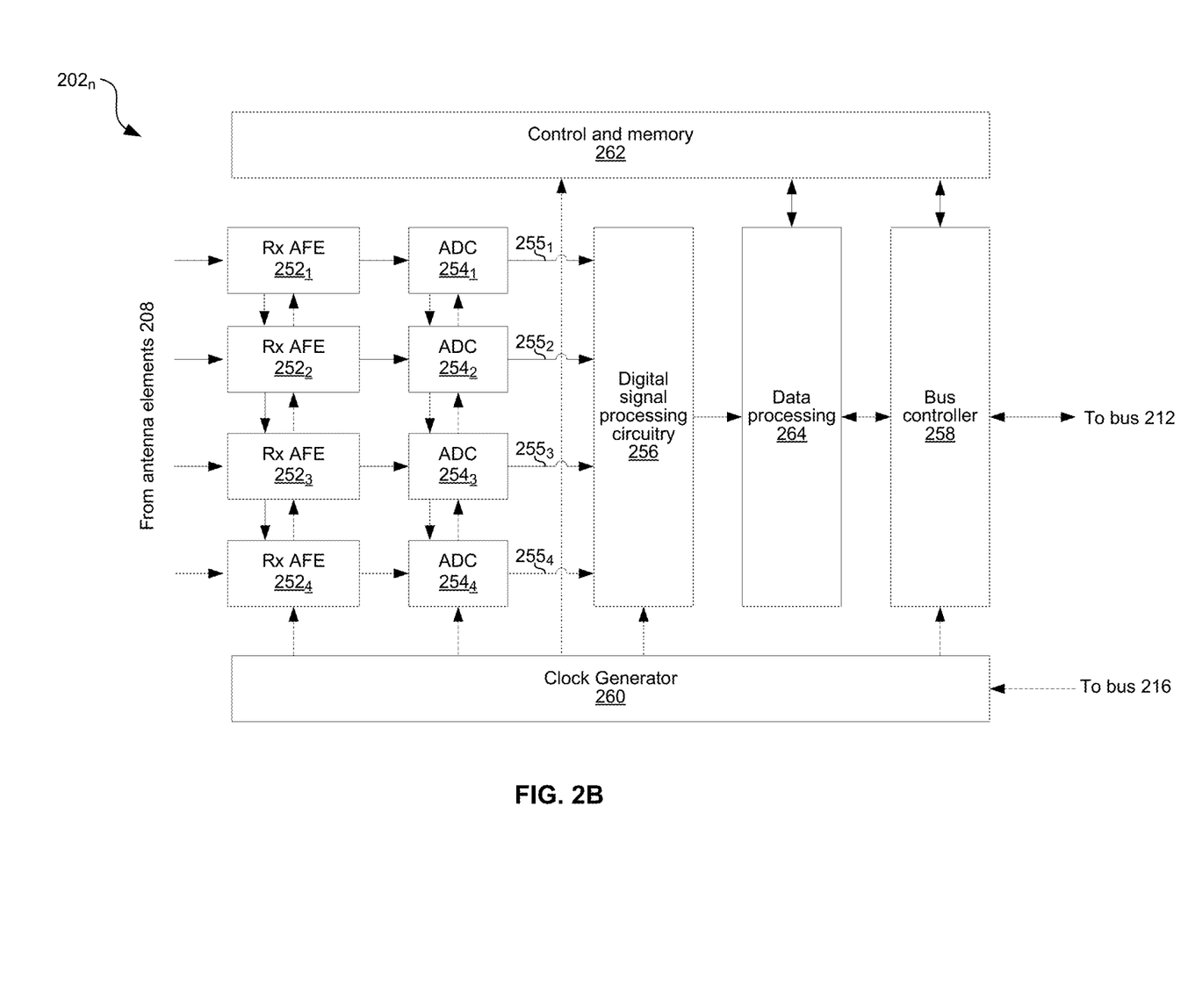
FIG. 2B shows an example implementation of a receiver system on chip (SoC) of a multifunctional radar transceiver of FIG. 2A.

FIG. 2B shows an example implementation of a receiver system on chip (SoC) of the multifunctional radar transceiver of FIG. 2A. The example receive SoC $202_n$ comprises a plurality (a number corresponding to the number of receive antenna elements 208) of receive analog front ends (Rx AFEs) 252, a plurality of analog-to-digital converters (ADCs) 254, digital signal processing circuitry 256, data processing circuitry 264, bus controller circuitry 258, clock generation circuit 260, and control and memory circuitry 262.

Each of the Rx AFEs 252 is operable to process a millimeter wave signal (e.g., in the band from 76 to 81 GHz) from a respective one of the plurality of antenna elements 208. The processing may comprise, for example, low noise amplification, filtering, and down-conversion so as to output a 1 to 5 GHz wide intermediate frequency or baseband signal.

Each of the ADCs 254 is operable to digitize the output of a corresponding one of the Rx AFEs 252. For example, each Rx AFE 252 may downconvert a received 76 to 77 GHz band to a 1 GHz wide baseband signal which the corresponding ADC 254 may then digitize to generate a 1 GHz wide digital signal. As another example, each Rx AFE 252 may downconvert a received 76 to 81 GHz band to a 5 GHz wide baseband signal which the corresponding ADC 254 may then digitize to generate a 5 GHz wide digital signal 255.

The digital signal processing circuitry 256 is operable to process the digitized signals from the plurality of ADCs 254 to recover information conveyed by the received signals. Such information may be conveyed by characteristics (e.g., latency, Doppler shift, signal strength, etc.) of the received signals, as is the case in a conventional radar system, and/or may be data that was modulated onto the received signals.

The processing performed by the digital signal processing circuit 256 may comprise, for example, channel estimation and equalization.

The processing performed by the digital signal processing circuit 256 may, where the millimeter wave signals are modulated by a data signal, comprise demodulation. For example, the millimeter wave signals transmitted by transceivers 102 may comprise bursts (or "chirps") whose amplitude is modulated relatively slowly as compared to the channel frequency (e.g., a few MHz as compared to a channel frequency of 76-81 GHz), and the digital signal processing circuitry 256 may be operable to track the signal envelope to recover the data signal. As another example, the millimeter wave signals transmitted by transceivers 102 may comprise OFDM symbols and the digital signal processing circuit 256 may be operable to demodulate the received signals using a discrete Fourier transform. The digital signal processing circuit 256 may then be operable to demap the modulated signal according to one or more symbol constellations, deinterleave the demapped bits, and decode the demapped bits. The recovered bits may then be provided to the control and memory subsystem 262 and/or output onto the bus 212.

The processing performed by the digital signal processing circuit 256 may comprise beamforming The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

The processing performed by the digital signal processing circuit 256 may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected.).

The processing performed by the digital signal processing circuit 256 may comprise separating different transmitted signals (e.g., originating from different ones of the transceivers $102_1$-$102_8$). The may comprise, for example, correlating the received signals with different orthogonal codes and/or pseudorandom sequences used by different ones of the transceivers $102_1$-$102_8$. Alternatively, or additionally, separating different transmitted signals (e.g., to determine which transceiver 102 sent which signal) may comprise directly recovering a respective identifier (e.g., a unique identifier such as a MAC address or similar) modulated onto each of the millimeter wave signals. The ability to distinguish which, if any, energy arrived from each transceivers $102_1$-$102_8$ may be useful for performing the radar function, the positioning function, and the communication function of the transceivers 102. For the radar and positioning functions, for example, the identification of which of transceivers $102_1$-$102_8$ sent any particular received signal may be used for determining the position and angle from which the signal was transmitted (since the different transceivers $102_1$-$102_8$ are at different positions on the automobile 100), which may be used for determining precise distance to, and location of, objects in the scene. For the communication function, for example, the identification of which of transceivers $102_1$-$102_8$ sent any particular received signal may be used in a manner similar to a "from" address in many networking protocols.

The data processing circuitry 264 is operable to process data output by the digital signal processing circuitry 256. Such processing may comprise, for example, implementing algorithms to generate a representation of the scene detected using the radar function. Based on the angle, strength, timing, spectral content, and/or other characteristics of the received signals, the data processing circuitry 264 may generate a 2D pixel grid or 3D voxel grid. In an example implementation, each pixel or voxel may indicate an absolute position to which it corresponds (determined via the positioning function of the multifunction radar system), the strength of returns, if any, received from that location (determined via the radar function of the multifunction radar system), spectral content of returns, if any, received from that location, and/or time(s) at which returns were received from that location and/or at which the pixel or voxel data was updated.

The data processing circuitry 264 may also be operable to process data received from the data bus 212. For example, positioning information may be received via the bus 212 (e.g., GPS coordinates from a GPS receiver of the vehicle 100) and combined with data recovered from the digital processing circuitry 264 for performing the positioning function.

The processing performed by data processing circuitry 264 of data output by digital signal processing circuitry 256 may comprise, for example, preparing data for output onto the data bus 212. For example, a scene representation generated from the output of the digital signal processing circuitry 256 may be transmitted onto the data bus 212.

The bus controller circuitry 258 may be substantially similar to the bus controller 206 described above.

The clock generation circuitry 260 is operable to generate a plurality of timing signals that are synchronized to the timing signal received via bus 216. The timing signals may comprise, for example: a local oscillator signal for direct downconversion of received millimeter wave signals (e.g., in the 76 to 81 GHz range), a sampling clock for the ADCs 254 (e.g., between 2 and 20 GHz), and one or more clocks for clocking the digital processing circuitry 256, the bus controller 258, and the control and memory subsystem 262.

The control portion of subsystem 262 is operable to manage operations of the receiver SoC $202_n$ (e.g., implement a state machine and/or other control logic that controls the configuration of the other components of the receive SoC $202_n$). The control portion of subsystem 262 may, for example, configure beamforming matrices used by the digital signal processing circuitry 256. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications from other transceivers 102 that are likely to come from that direction. Directions of interest may be determined based on, for example, data received via the data bus, data carried in previously received millimeter wave signals, and/or previously generated scene representations.

The memory portion of subsystem 262 is operable to store relatively large amounts (e.g., hundreds of megabits) of information of a variety of forms. For example, beamforming matrices, an identifier of the transceiver 102, scrambling codes, and messages received from (via data bus 212) and/or to be communicated to (via data bus 212 and/or via millimeter wave signals) other transceivers are just some examples of the information which may be stored in the memory and readily accessible to the SOC $202_n$.

Figure 2C:
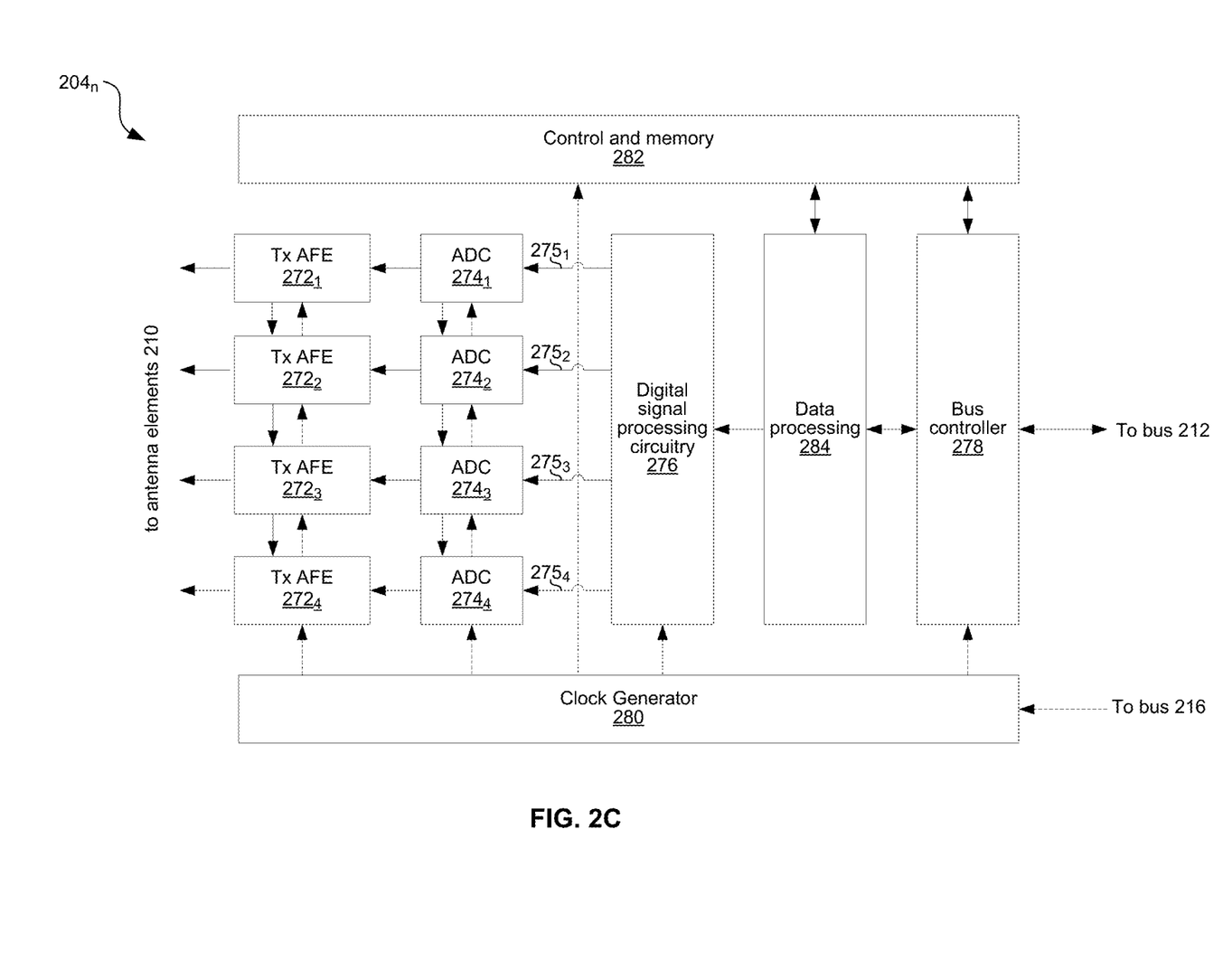
FIG. 2C shows an example implementation of a transmitter system on chip (SoC) of a multifunctional radar transceiver of FIG. 2A.

FIG. 2C shows an example implementation of a transmitter system on chip (SoC) of the multifunctional radar transceiver of FIG. 2A. The example transmit SoC $204_n$ comprises a plurality of transmit analog front ends (Tx AFEs) 272, a plurality of analog-to-digital converters (ADCs) 254, digital signal processing circuitry 276, data processing circuitry 284, bus controller circuitry 278, clock generation circuit 280, and control and memory subsystem 282.

Each of the Tx AFEs 272 is operable to receive an analog baseband signal from a respective one of ADCs 274, upconvert the signal to a millimeter wave (e.g., a 1 GHz to 5 GHz wide signal in the band from 76 to 81 GHz), and amplify the millimeter wave signal for output to a respective one of antenna elements $210_1$-$210_4$.

Each of the ADCs 274 is operable to convert a digital signal 275 from the digital signal processing circuitry 276 to an analog representation. For example, each signal 275 may be a 1 GHz to 5 GHz wide baseband signal.

The digital signal processing circuitry 276 is operable to process one or more data streams from data processing circuitry 284 to generate a plurality (four in the example shown) of digital baseband signals 275. Processing performed by digital signal processing circuitry 276 may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The processing performed by the digital signal processing circuit 276 may comprise generating modulated signals $275_1$-$275_4$ and/or generating a data signal to be modulated onto a carrier. As an example of the former case, the digital signal processing circuit 276 may output a continuous wave signal, or a chirp whose amplitude is modulated by a data signal whose frequency is relatively low (e.g., a few MHz) as compared to the channel frequency (e.g., between 76 GHz and 81 GHz). As another example of the former case, the digital signal processing circuit 276 may output an OFDM signal. As an example of the latter case, the digital signal processing circuit 276 may output a relatively low bandwidth data signal (e.g., a few MHz) which may modulate a millimeter wave chirp generated by the clock generator 280.

The processing performed by the digital signal processing circuit 276 may comprise beamforming The beamforming may comprise time-domain beamforming and/or frequency-domain beamforming Data processing circuit 284 is operable to generate one or more data signals for modulation onto the millimeter wave signals transmitted by the SoC $204_n$. The datastreams may, for example, be read from memory of the SoC $202_n$ (e.g., an identifier of the module $102n$) and/or generated algorithmically (e.g., timestamps generated based on a clock of the control portion of subsystem 282). Additionally, or alternatively, the data may be received from bus 212 via bus controller 278. The data processing circuit 284 may packetize and/or otherwise format the data.

Bus controller 278 may be substantially similar to the bus controller 206 described above.

Clock generation circuit 280 is operable to generate a plurality of timing signals that are synchronized to the timing signal received via bus 216. The timing signals may comprise, for example: a local oscillator signal for upconversion of baseband signals to millimeter wave signals (e.g., in the 76 to 81 GHz range), a sampling clock for the DACs 274 (e.g., between 2 and 20 GHz), and one or more clocks for clocking the digital processing circuitry 276, the bus controller 278, and the control and memory subsystem 282.

The control portion of subsystem 282 is operable to manage operations of the receiver SoC $204_n$ (e.g., implement a state machine and/or other control logic that controls the configuration of the other components of the receive SoC $204_n$). The control portion of subsystem 282 may, for example, configure beamforming matrices used by the digital signal processing circuitry 276. For example, the control portion of subsystem 282 may determine that particular directions are of interest at a given time and may configure the beamforming to point beams in those particular directions. Particular directions may be of interest because, for example, it may be desirable to determine more information about objects located in that direction and/or to listen for communications from other transceivers 102 that are likely to come from that direction. Directions of interest may be determined based on, for example, data received via the data bus 212, scene scanning algorithms, and/or the like.

The memory portion of subsystem 282 is operable to store relatively large amounts (e.g., hundreds of megabits) of information of a variety of forms. For example, beamforming matrices, and messages received from (via data bus 212 and/or millimeter wave signals) and/or to be communicated to (via data bus 212 and/or modulated onto millimeter wave radar signals) other transceivers are just some examples of the information which may be stored in the memory and readily accessible to the SoC $204n$.

Figure 3A:
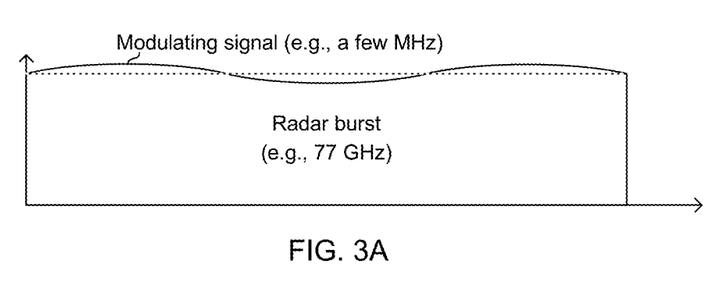
FIG. 3A and 3B show two example signal formats used by a multifunctional radar transceiver.
Figure 3B:
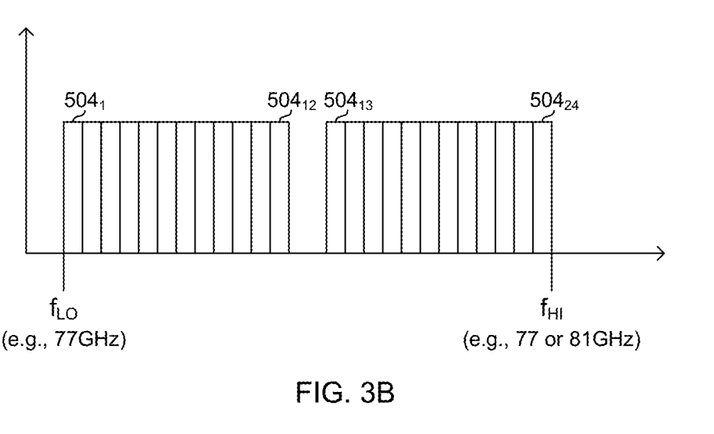

FIG. 3A and 3B show two example signal formats used by a multifunctional radar transceiver. In FIG. 3A, the millimeter wave signal (e.g., a continuous wave signal or series of frequency ramped "chirps") is amplitude modulated by a relatively slowly varying data signal. In FIG. 3B the millimeter wave signal is an OFDM signal which, for any given burst (frame) may transmit one or more of a plurality of subbands 504 (twenty-four subbands were chosen arbitrarily for illustration, any number may be used). Each of the subbands $504_1$-$504_{24}$ may be a continuous wave or may be modulated by a data signal (e.g., a N-QAM symbol corresponding to $\log_2(N)$ bits of the data signal). Different subbands and/or groups of subbands may be allocated for different purposes (e.g., some for radar, some for positioning, and some for communication). Similarly, using frequency-domain beamforming, different subbands and/or groups of subbands may be pointed in different directions for detecting objects at different locations in the scene and/or for transmitting the data signal in directions (e.g., pointed at different reflection paths leading to different ones of the transceivers $102_1$-$102_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

Figure 4:
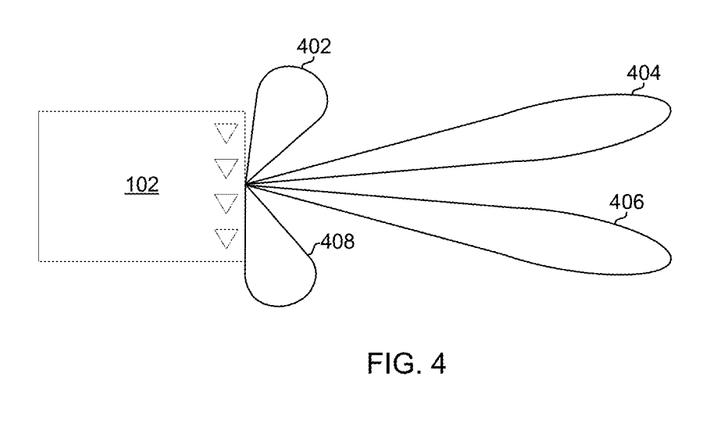
FIG. 4 shows an example antenna pattern of the multifunctional radar transceiver of FIG. 2

FIG. 4 shows an example antenna pattern of the multifunctional radar transceiver of FIG. 2. For example, for the radar function, lobes 402 and 408 may be used for identifying objects that are relatively close and off to the side of the transceiver $102_n$, and the lobes 404 and 406 may be used for looking further in the distance (e.g., in the direction of travel of the automobile 100 or looking behind the automobile 100). As another example, for the radar function, the lobes 402 and 408 may receive returns from the nearby road surface and the Doppler of such returns may be used for calculating the speed of the automobile 100. As another example, for the communication function, lobes 402 and 408 may be used for directly communicating with another transceiver 102 off to the side of the depicted transceiver $102_n$ and lobes 404 and 406 may be used for communicating with other transceivers by bouncing the signals off of objects in the scene.

Although four beams/lobes are shown for illustration, the multifunctional radar transceivers are not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 402, 404, 406, and 408 may change periodically, based on what is detected in the scene, based on desired communication to be sent or received, to avoid self-interference, to avoid interfering with other transceivers, to avoid interference from other transceivers, and/or the like.

Figure 5:
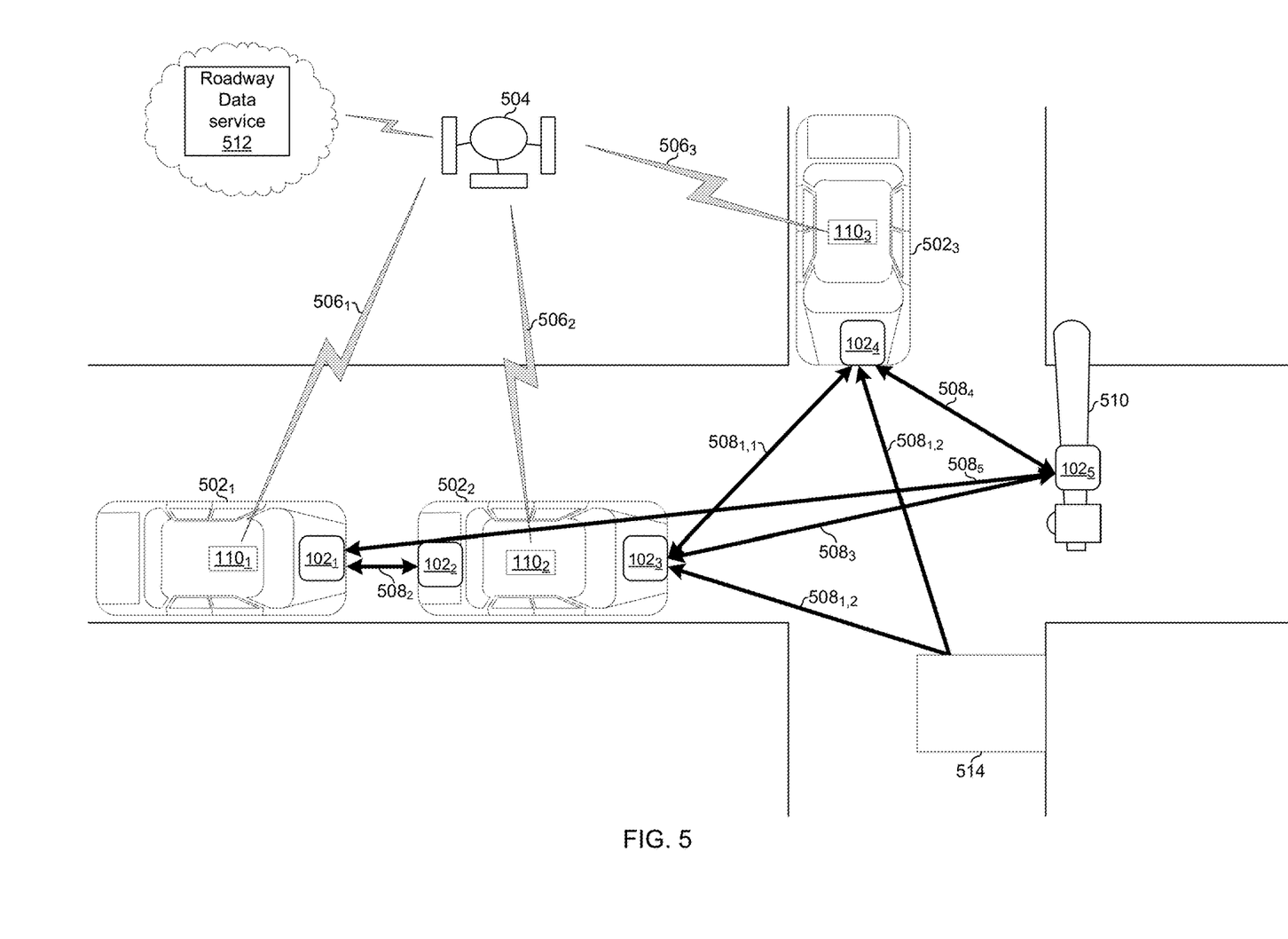
FIG. 5 is a diagram illustrating communications among automobile mounted and infrastructure mounted multifunctional radar transceivers.

FIG. 5 is a diagram illustrating communications among automobile mounted and infrastructure mounted multifunctional radar transceivers. Shown are automobiles $502_1$, $502_2$, and $502_3$, each comprising one or more multifunctional radar transceivers 102. Also shown is a basestation 504 (a cellular basestation in this example), an object 514 (e.g., a parked car, a building, or any other object which reflects millimeter wave signals), a roadway data service 512, and a piece of infrastructure (a stop-light in this example) 510 to which is mounted a multifunctional radar transceiver 102.

Various connections $508_1$-$508_5$ are established among the multifunctional radar transceivers $102_1$-$102_5$. As shown, some connections are direct line of sight (connections $508_2$-$508_5$ and one path, $508_{1,1}$ of connection $508_1$) and some are via a reflection off of another object (the second path $508_{1,2}$ of connection $508_1$). A transceiver 102 may discover other transceivers by scanning a variety of transmit and receive angles until a signal from a potential communication partner is detected. Additionally, or alternatively, a transceiver 102 may receive information about the location of other transceivers from the service 512 accessible via the base station 504.

The physical layer signals of the connections $508_1$-$508_5$ may concurrently be used for performing the radar function (e.g., reflections of signals sent by transceiver $102_1$ on connection $508_2$ may be used by transceiver $102_1$ to track speed/velocity/position/etc. of automobile $502_2$, reflections of signals sent by transceiver $102_5$ on connection $508_4$ may be used by transceiver $102_5$ to track speed/velocity/position/ etc. of automobile $502_3$, and so on). Each automobile is also communicating with base station 506 via a respective one of connections $506_1$-$506_3$ (e.g., LTE (or other cellular connection), 802.11p, and/or other suitable communication protocols).

The roadway data service 512 is a web-based service that collects ("crowds-sources") data from transceivers 102, and, in an example embodiment, analyzes the data. The roadway data service then makes the data and/or results of the analysis of the data (if the analysis is performed) available via the Internet or other suitable network. As further described below, data from the roadway data service may be used by automobiles 502 and/or by other entities such as police, fire fighters, or municipal organizations in charge of managing and maintaining the roadways, etc.

Data communicated over the connections $508_1$-$508_5$ may comprise data related to any one or more of the radar, positioning, and communication functions performed by the transceivers $102_1$-$102_5$, and/or may be related to other functions performed by the circuitry $110_2$ and $110_3$ (e.g., data output by various sensors), such that the radar signals serve as a millimeter wave backhaul for any data desired to be communicated among automobiles and/or among automobiles and infrastructure-mounted transceivers.

Data communicated over the connections $508_1$-$508_5$ may comprise, for example, scene representations generated via the radar function of the transceivers $102_1$-$102_5$, and/or scene representations generated by other transceivers that previously passed through the intersection and uploaded scene information they gathered to the roadway data service 512. The scene representations may be current and/or historical scene representations. A historical scene representation may be useful, for example, where two automobiles are headed in opposite directions and the first can alert the second as to a hazard that the first vehicle passed and that the second vehicle is approaching Data communicated over the connections $508_1$-$508_5$ may comprise, for example, warnings about conditions or situations on the roadway. For example, upon detecting a condition on the roadway (e.g., an obstruction in the road, a dangerous driver, pedestrians, etc.), a transceiver 102 of a first automobile may broadcast an alert for nearby transceivers 102 to receive. The alert may identify the precise location of the obstruction based on the positioning function. The alert may also be conveyed to the roadway data service such that it can be received over an even wider area (although with higher latency which may make it less effective in providing an early warning to automobiles in the vicinity of the condition).

Data communicated over the connections $508_1$-$508_5$ may comprise, for example, informational messages about the state of the current location of the transmitter that sent the message. For example, a notification of an empty parking space, a notification of a full parking lot, a notification of an accident, a notification of bad traffic, etc.

Data communicated over the connections $508_1$-$508_5$ may, for example, signal intent of an automobile. For example, an intent to change lanes, an intent to speed up, an intent to brake, an intent to turn, a desire to pass another automobile, etc. These alerts may be generated by circuitry 110 (e.g., in response to the driver turning on the turning signal, turning the wheel, pressing (moving his/her foot toward) the pedal, in response to a navigation system indicating that the planned route includes an upcoming turn, etc.) and conveyed to a transceiver 102 for transmission to other transceivers 102.

Data communicated over the connections $508_1$-$508_5$ may comprise, for example, requests for information. For example, a transceiver 102 of a vehicle that is about to turn (as determined by a planned route on its navigation system for example, or by a breaking and engaging of the turning signal), may attempt to communicate with a transceiver 102 of an automobile that is around the corner in order to "look ahead" (e.g., to determine if there are pedestrians there, etc.) before actually making the turn.

Scene representations generated by the transceivers 102 (individually and/or cooperatively by direct communications and/or communications with the roadway data service 512), or data gleaned from such scene representations, may be used for controlling the automobiles and/or the stop light 510. The former may comprise, for example, automatically braking, accelerating, engaging turning signals, triggering alerts on dashboard instrumentation, etc. The latter may comprise altering when the stop light 510 changes to prevent accidents and/or to manage traffic flow. For example, the transceiver $102_5$ may analyze a scene representation to determine that automobile $502_2$ heading east is unlikely to stop in time for the next scheduled east-facing red light/north-facing green light. The transceiver $102_5$ may thus signal control circuitry of the stop light 105 to delay the north-facing green light to prevent a collision between $502_2$ and $502_3$. As another example, the transceiver $102_5$ may analyze a scene representation to determine pedestrians are present in the intersection and signal circuitry of the stop light 105 to stay red until the pedestrians have completed crossing.

In some instances, data may be relayed from one connection 508 to another in a multi-hop fashion in order to communicate data between transceivers 102 that cannot communicate via single hop (e.g., no direct line of sight and no suitable object(s) for reflecting the signals off of to reach the destination transceiver).

Figure 6:
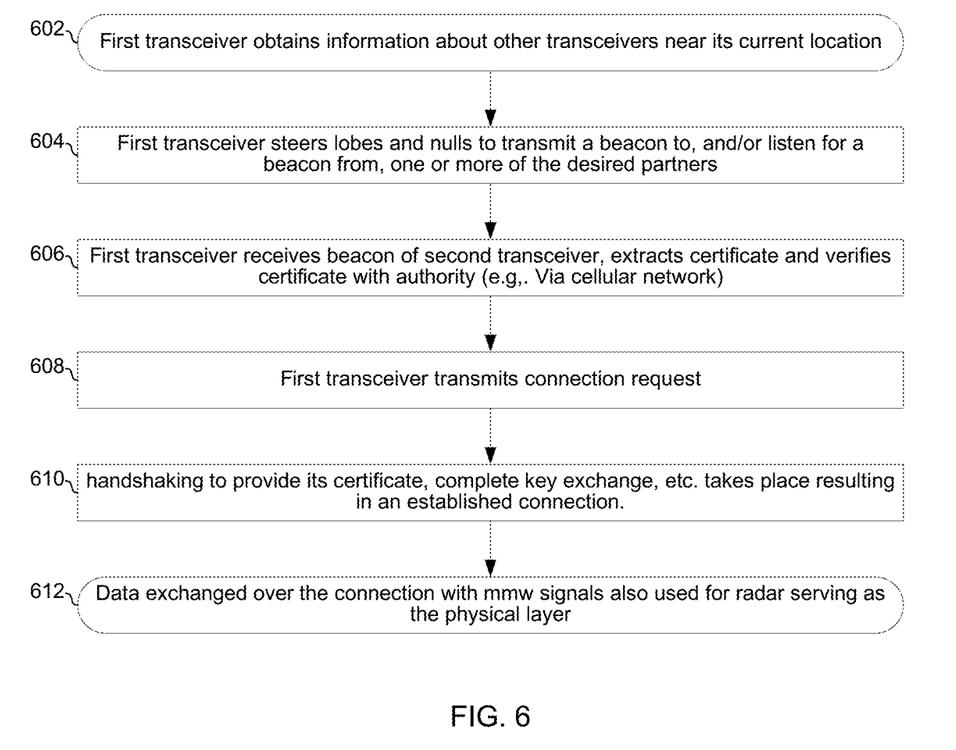
FIG. 6 is a flowchart illustrating an example process for secure communications between two multifunctional automotive transceivers.

FIG. 6 is a flowchart illustrating an example process for secure communications between two multifunctional automotive transceivers. FIG. 6 is described with reference to transceivers $102_3$ and $102_4$, which have been chosen arbitrarily from the transceivers of FIG. 5 for purposes of illustration.

In block 602, before any of the connections $508_1$-$508_5$ of FIG. 5 have been established, transceiver $102_3$ obtains information about other transceivers near its current location. The information may, for example, be obtained from a scene representation that transceiver $102_3$ generates using millimeter wave signals transmitted by it and/or by one or more others of the transceivers $102_1$-$102_5$. The transceiver $102_3$ may then analyze the scene representation to detect automobile $502_3$ and object 514. The detections may be via one or more of: reflections of signals transmitted by transceiver $102_3$ along paths corresponding to connections $508_{1,1}$, $508_3$, and $508_{1,2}$, and/or reception of signals transmitted by transceiver $102_4$ along paths corresponding to connections $508_{1,1}$ and $508_{1,2}$. Additionally, or alternatively, the information may be obtained from the roadside data service 512 in response to the automobile $502_2$ sending its location (determined using the positioning function of transceiver(s) $102_2$ and/or $102_3$) to the service 512 via the connection $506_2$.

In block 604, the transceiver $102_3$ configures its beamforming coefficients to direct transmit and/or receive lobes in the direction of the arrow representing (not yet established) connection $508_{1,1}$ and/or in the direction of the arrow representing (not yet established) connection $508_{1,2}$, and to direct a receive null in the direction of the arrow representing (not to be established in this example) connection $508_3$. The transceiver $102_3$ then begins broadcasting beacons and listening for beacons. Channel(s) on which it listens may be predetermined and/or determined dynamically (e.g., based on capturing the full spectrum used by transceivers 102 (e.g., 76 to 81 GHz) and analyzing the interference on various possible beacon channels).

In block 606, transceiver $102_3$ receives a beacon of transceiver $102_4$, extracts a certificate from the beacon (or requests the certificate in accordance with information obtained from the beacon) and then verifies the certificate with a certificate authority accessed via connection $506_2$. In an example implementation, authentication may be supplemented by other data. For example, circuitry 1102 may comprise an optical camera which may capture a picture of an automobile $110_3$ to verify that the make, model, license plate number, etc., match the certificate that was received.

In block 608, transceiver $102_3$, having verified the authenticity of transceiver $102_4$, sends a connection request modulated onto a millimeter wave signal and waits for a reply. While waiting for the reply, the transceiver $102_3$ may use reflections of the request for performing its radar and positioning functions.

In block 610, the transceiver $102_4$ replies on a millimeter wave signal and handshaking takes place which may include the transceiver $102_3$ providing its certificate, and exchange of encryption keys, etc. When handshaking is complete, connection(s) $508_1$ is established (over one or both of the paths $508_{1,1}$ and $508_{1,2}$)

In block 610, data is exchanged between transceivers $102_3$ and $102_4$ via the connection $508_1$, and reflections of the millimeter wave signals used for the data communications are also used for the radar and positioning functions.

Figure 7:
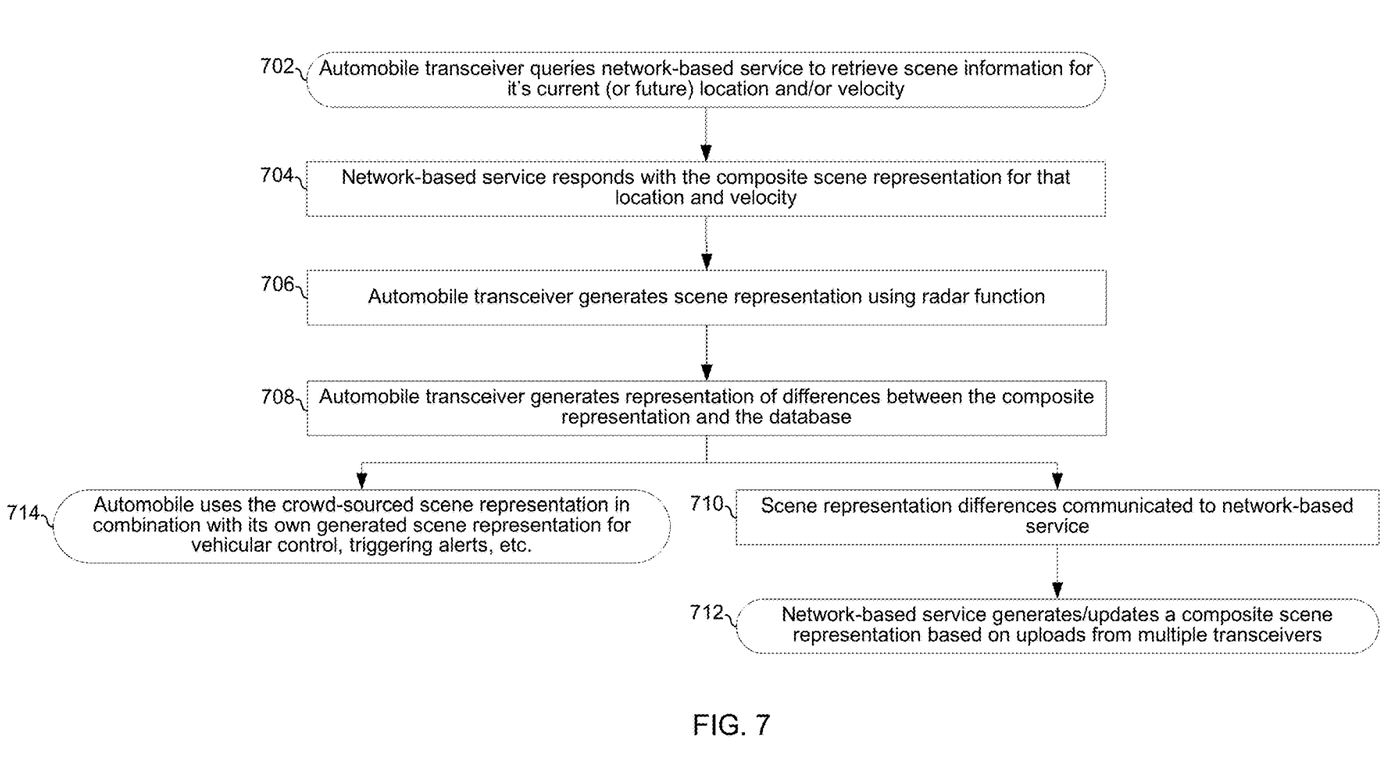
FIG. 7 is a flowchart illustrating an example process for crowd-sourced automotive radar data.

FIG. 7 is a flowchart illustrating an example process for crowd-sourced automotive radar data. FIG. 7 is described with reference to transceiver $102_4$, which has been chosen arbitrarily from the transceivers of FIG. 5 for purposes of illustration.

In block 702, transceiver $102_4$ queries service 512 via connection $506_3$ to retrieve scene information. The query may include the current location and velocity of the automobile $502_3$ (e.g., determined using the positioning function of radar transceiver $102_4$), such that the service knows the perspective from which the transceiver $102_4$ is seeing the scene, and such that information will not be outdated by the time it makes it to the automobile $502_3$ via the connection $506_3$.

In block 704, the service 512 responds with scene information for the location(s) and velocity(ies) identified by the query$_3$. The information from service 512 may comprise a crowd-sourced scene representation (e.g., pixel and/or voxel grid) generated over time from transceivers such as $102_1$, $102_2$, $102_3$, $102_5$ and/or other transceivers that have previously been in the location(s) for which the scene information is being provided.

In block 706, the transceiver $102_4$ generates a scene representation using its radar function and/or its communication function. The former comprises analysis of: reflections of its own transmitted millimeter wave signals, reflections of millimeter wave signals transmitted by the transceivers $102_3$ and/or $102_5$, and/or millimeter wave signals received directly (without reflection) from transceivers $102_3$ and $102_5$. The latter comprises receiving scene representations, or information gleaned from analysis of scene representations, from transceiver(s) $102_3$ and/or $102_5$ in the form of data modulated onto the millimeter wave signals.

In block 708, the transceiver $102_4$ determines differences between the crowd-sourced information received in block 704 and the scene representation generated in block 706. In an implementation in which the crowd-sourced information is an average representation of the scene generated over time from many transceivers, objects present in the scene are static objects (i.e., objects such as light poles, medians, etc., that are present in the same location over long periods of time), and thus the differences in the scene representation generated in block 708 correspond to dynamic objects (moving cars, pedestrians, etc.) in the scene. This may aid the transceiver $102_4$ in determining which objects to track, which alerts to generate, etc. (e.g., no point in expending energy repeatedly analyzing reflections from a light pole since it is not going anywhere).

In block 710, the differences between the crowd-sourced information received in block 704 and the scene representation generated in block 706 are uploaded to the service 512 (e.g., in the form of a pixel or voxel grid where only pixels corresponding to the differences have nonzero values). By uploading only the differences, the amount of data that needs to be uploaded may be relatively small.

Instead of, or in addition to, uploading scene differences, other data may be uploaded to the service 512. Such data may, for example, include any or all of the types of data described above as being communicated over connections 508. While the roadway data service 512 has the disadvantage of latency and lower bandwidth of the connections 506 as compared to the connections 508, it has the advantage of receiving data from many transceivers 102 over time, and thus being able to "crowd-source" many scene representations from many perspectives and thus create continually evolving, very high resolution scene representations in near real time.

In block 712, the service 512 uses the data from transceiver $102_4$ received in block 710 to update the crowd-sourced scene information.

In block 714, the automobile (i.e., the circuitry $110_3$ and/or transceiver $102_4$) use(s) the crowd-sourced scene information received in block 704 and/or the scene representation generated in block 706 for performing various functions such as controlling the automobile $502_3$, triggering alerts to a driver of automobile $502_3$, generating alerts and communicating them to transceiver(s) $102_3$ and/or $102_5$ via connection(s) $508_1$ and/or $508_4$, etc.

As mentioned above, scene information communicated among transceivers 102 and between transceivers 102 and service 512 may be tagged with very precise positioning information obtained using the radar function so that there is a common frame of reference that can be used for combining scene representations or otherwise using scene information from multiple sources.

Each of service 512 and the automobile $502_3$ may proceed with caution when using the data received from the other. If, for example, the scene representation from transceiver $102_4$ varies wildly from the existing crowd-sourced representation, the scene representation 1024 may be ignored as erroneous and the transceiver $102_4$ may even report faulty operation of the transceiver $102_4$ to the automobile $502_3$ (such that it can recalibrate or seek repair) and/or to a centralized authority.

In another implementation, it may be that the service 512 calculates differences between the average/aggregate crowd-sourced scene information and scene information received from individual transceivers such that the amount of data to be sent on the downlink to the automobiles is relatively small.

In an example implementation of this disclosure, a system comprises a multifunction radar receiver (e.g., $102_N$) that in turn comprises processing circuitry (e.g., 256, 260, and/or 262) and front-end circuitry (e.g., 252). The front-end circuitry is operable to receive a millimeter wave burst via a plurality of antennas (e.g., 208) to generate a plurality of received signals. The processing circuitry is operable to receive a first scene representation that is an aggregate of scene representations generated by one or more other radar receivers (e.g., $202_1$ and $202_2$). The processing circuitry is operable to process the received signals to generate a second scene representation. The processing circuitry is operable to compare the first scene representation and the second scene representation and generate a difference scene based on the comparison. The processing circuitry is operable to generate a control signal based on the difference scene. The multifunction receiver may reside in a passenger vehicle (e.g., $502_2$) and the control signal may control, at least in part, one or more of: brakes, an accelerator, steering system, turn signals, and dashboard instrumentation. The multifunction radar receiver may comprise bus interface circuitry. The multifunction radar receiver may comprise bus interface circuitry that may be operable to output the first scene representation and/or the difference scene via the bus interface circuitry. The first scene representation may be modulated on the millimeter wave radar burst, and the processing circuitry may be operable to demodulate the millimeter wave radar burst to recover the first scene representation. The multifunction radar receiver may be operable to receive the first scene representation via the bus interface circuitry. The multifunction receiver may reside in a passenger vehicle, and the control signal may control transmissions of a transmitter (e.g., $204_N$ or 110) of the passenger vehicle. The system may comprise a multifunction radar transmitter (e.g., $204_N$). The multifunction radar transmitter may be operable to receive one or both of the first scene representation and the difference scene via the bus interface circuitry. The multifunction radar transmitter may be operable to modulate the one or both of the first scene representation and the difference scene onto a millimeter wave radar burst. The multifunction radar transmitter may be operable to transmit the one or both of the first scene representation and the difference scene into a network destined for a server of a roadside data service.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A system comprising:
a radar transceiver receiver that comprises transmitter circuitry, processing circuitry, and receiver circuitry, wherein:
the transmitter circuitry is operable to transmit millimeter wave bursts for reflection off of objects near the radar transceiver;
the receiver circuitry is operable to receive millimeter wave bursts via a plurality of antennas and generate digital signals for processing; and
the processing circuitry is operable to:
process digital signals generated from one or more received millimeter wave bursts to generate a first scene representation that is an average of scene representations generated by one or more transceivers external to the radar transceiver;
process digital signals generated from one or more different received millimeter wave bursts received from reflections of millimeter wave bursts transmitted by the radar transmitter circuitry to generate a second scene representation;
compare the first scene representation and the second scene representation to determine if any dynamic objects are in the second scene representation based on the comparison; and
generate a control signal based on the determination of any dynamic objects.

2. The system of claim 1, wherein the radar transceiver resides in a passenger vehicle and the control signal controls, at least in part, one or more of: brakes, an accelerator, steering system, turn signals, and dashboard instrumentation.

3. The system of claim 2, wherein:
the radar transceiver comprises bus interface circuitry; and
the receiver circuitry is operable to communicate the first scene representation via the bus interface circuitry.

4. The system of claim 1, wherein:
the radar transceiver comprises bus interface circuitry; and
the receiver circuitry is operable to communicate data representing any determined dynamic objects via the bus interface circuitry.

5. The system of claim 2, wherein:
the transmitting circuitry is located near a front of said passenger vehicle.

6. The system of claim 3, wherein the radar transceiver is operable to communicate the first scene representation to one or more other transceivers in the passenger vehicle via the bus interface circuitry.

7. The system of claim 1, wherein the receiver circuitry resides in a passenger vehicle and the control signal controls transmissions of a transmitter of the passenger vehicle.

8. The system of claim 1, wherein the transmitter circuitry is coupled to the receiver circuitry via bus interface circuitry.

9. The system of claim 8, wherein the transmitter circuitry is operable to:
receive one or both of the first scene representation and data representing any determined dynamic objects via the bus interface circuitry; and
modulate the one or both of the first scene representation and data representing any determined dynamic objects onto a millimeter wave radar burst.

10. The system of claim 8, wherein the transmitter circuitry is operable to:
receive one or both of the first scene representation and data representing any determined dynamic objects via the bus interface circuitry; and
transmit the one or both of the first scene representation and data representing any determined dynamic objects to a roadside data service.

11. A method comprising:
transmitting, by transmitter circuitry of a radar transceiver, millimeter wave bursts for reflection off of objects near the radar transceiver;
receiving, by receiver circuitry of the radar transceiver, millimeter wave radar bursts via a plurality of antenna elements and generate digital signals for processing;
processing, by processor circuitry of the radar transceiver, digital signals from one or more received millimeter wave radar bursts to generate a first scene representation that is an average of scene representations generated by one or more transceivers external to the radar transceiver;
processing, by the processor circuitry of the radar transceiver, digital signals generated from one or more different received millimeter wave radar bursts received from reflections of millimeter wave bursts transmitted by the radar transmitter circuitry to generate a second scene representation;
comparing, by the processor circuitry of the radar transceiver, the first scene representation and the second scene representation;
determining, by the processor circuitry of the radar transceiver, if any dynamic objects are in the second scene representation based on the comparison; and
generating, by the processor circuitry of the radar transceiver, a control signal based the determination of any dynamic objects.

12. The method of claim 11, wherein the radar transceiver resides in a passenger vehicle and the method comprises the processor circuitry of the radar transceiver controlling, via the control signal, one or more of: brakes, an accelerator, steering system, turn signals, and dashboard instrumentation.

13. The method of claim 12, comprising the processor circuitry of the radar transceiver communicating the first scene representation via a data bus.

14. The method of claim 11, comprising the processor circuitry of the radar transceiver communicating data representing any determined dynamic objects to one or more radar transmitters via a data bus.

15. The method of claim 12, wherein the one or more received millimeter wave radar bursts are generated by a radar transmitter in said passenger vehicle.

16. The method of claim 13, comprising communicating, by the processor circuitry of the radar transceiver, the first scene representation to one or more receivers in the passenger vehicle via the data bus.

17. The method of claim 11, wherein the transceiver resides in a passenger vehicle and the method comprises the processor circuitry of the radar transceiver controlling, via the control signal, transmissions of a transmitter of the passenger vehicle.

18. The method of claim 11, comprising the processor circuitry of the radar transceiver communicating, via a data bus, with a radar transmitter.

19. The method of claim 18, comprising:
- the processor circuitry of the radar transceiver receiving one or both of the first scene representation and the data representing any determined dynamic objects via a data bus; and
- the transmitter circuitry modulating the one or both of the first scene representation and the data representing any determined dynamic objects onto a millimeter wave radar burst.

20. The method of claim 18, wherein:
- the processor circuitry of the radar transceiver receiving one or both of the first scene representation and data representing any determined dynamic objects via a data bus; and
- the transmitter circuitry transmitting the one or both of the first scene representation and the data representing any determined dynamic objects to a roadside data service.

* * * * *